United States Patent
Lawson

(10) Patent No.: US 11,390,698 B2
(45) Date of Patent: Jul. 19, 2022

(54) METHODS OF POLYOLEFIN SOLIDS RECOVERY

(71) Applicant: ExxonMobil Chemical Patents Inc., Baytown, TX (US)

(72) Inventor: Kevin W. Lawson, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 345 days.

(21) Appl. No.: 16/634,904

(22) PCT Filed: Jun. 6, 2018

(86) PCT No.: PCT/US2018/036179
§ 371 (c)(1),
(2) Date: Jan. 29, 2020

(87) PCT Pub. No.: WO2019/027566
PCT Pub. Date: Feb. 7, 2019

(65) Prior Publication Data
US 2020/0231719 A1    Jul. 23, 2020

Related U.S. Application Data

(60) Provisional application No. 62/539,664, filed on Aug. 1, 2017.

(30) Foreign Application Priority Data

Sep. 26, 2017  (EP) ..................... 17193041

(51) Int. Cl.
*C08L 23/12* (2006.01)
*C08F 6/00* (2006.01)
*C08L 23/06* (2006.01)

(52) U.S. Cl.
CPC .............. *C08F 6/005* (2013.01); *C08L 23/06* (2013.01); *C08L 23/12* (2013.01)

(58) Field of Classification Search
USPC ................................................. 528/480, 483
See application file for complete search history.

(56) References Cited

U.S. PATENT DOCUMENTS

| | | | |
|---|---|---|---|
| 4,640,963 A | 2/1987 | Kreider et al. | |
| 6,559,348 B1 | 5/2003 | Aittamaa et al. | |
| 7,098,301 B1 | 8/2006 | Smith | |
| 10,131,719 B2 | 11/2018 | Penzo et al. | |
| 2004/0136882 A1* | 7/2004 | Verser .................. | B01J 8/222 422/131 |
| 2006/0135631 A1 | 6/2006 | Kopponen et al. | |
| 2009/0071414 A1 | 3/2009 | Caputo | |
| 2011/0046323 A1* | 2/2011 | Van Der Schrick ..... | C08J 11/02 203/42 |
| 2016/0002376 A1 | 1/2016 | Kang et al. | |
| 2016/0297899 A1* | 10/2016 | Banat .................... | C08F 10/06 |

FOREIGN PATENT DOCUMENTS

| | | |
|---|---|---|
| EP | 2172494 A | 4/2010 |
| EP | 2743279 A | 6/2014 |
| EP | 3075749 A | 10/2016 |
| WO | 93/13843 A | 7/1993 |
| WO | WO 2009/071414 A1 | 6/2009 |
| WO | 2017/023433 A | 2/2017 |
| WO | 2019/027565 A | 2/2019 |

* cited by examiner

*Primary Examiner* — Terressa Boykin
(74) *Attorney, Agent, or Firm* — Vorys, Sater, Seymour and Pease LLP

(57) ABSTRACT

Methods for separating gaseous components, such as unreacted hydrocarbon monomer and/or solvent, from polyolefin solids are provided. The methods include flowing a first stream including polyolefin solids and gaseous unreacted hydrocarbon monomer and/or solvent through a portion of a gas-solid separation vessel having a volume sufficient so that polyolefin solids present in the first stream have an increased residence time within the gas-solid separation vessel to separate gaseous unreacted hydrocarbon monomer and/or solvent from the polyolefin solids to produce a second stream including polyolefin solids substantially free of gaseous unreacted hydrocarbon monomer and/or solvent and a third stream including the gaseous unreacted hydrocarbon monomer and/or solvent. Systems for carrying out such methods are also provided.

21 Claims, 3 Drawing Sheets

METHODS OF POLYOLEFIN SOLIDS RECOVERY

PRIORITY CLAIM

This application is a National Phase Application claiming priority to PCT Application Serial No. PCT/US2018/036179 filed Jun. 6, 2018, which claims priority to and the benefit of U.S. Provisional Application No. 62/539,664, filed Aug. 1, 2017, and EP 17193041.5, filed Sep. 26, 2017, the disclosures of which are incorporated herein by reference.

FIELD OF THE INVENTION

The present disclosure relates to methods and systems for producing polyolefins including methods and systems for separating gaseous unreacted hydrocarbon monomer and/or solvent from polyolefin solids.

BACKGROUND OF THE INVENTION

Polyolefins, such as polyethylene and polypropylene, may be prepared by particle form polymerization, also referred to as slurry polymerization. In this technique, a monomer feed may be polymerized in a reaction zone in the presence of a catalyst and optionally, a solvent (also known as a diluent) to produce a polymerization effluent containing a slurry of polymer solids in a liquid medium comprising unreacted hydrocarbon monomer and optionally, solvent. In order to recover the polymer solids from the slurry, the polymerization effluent may be withdrawn from the reactor and the polymer solids may be separated from the liquid medium. Typical polymer recovery and separation systems include subjecting the polymerization effluent to a reduction in pressure so that the liquid medium may vaporize leaving concentrated polymer solids. In some instances, the reduction in pressure can occur, for example, in a first high pressure flash tank and a further reduction may occur, for example, in a second lower pressure flash tank. The vaporized liquid medium may exit at an upper portion of a flash tank, while the polymer solids may be recovered through a lower portion of the flash tank. The vaporized liquid medium can then be recycled back to the reaction zone.

While the liquid vapor separation may remove a substantial portion of the liquid medium from the polyolefin solids, at least a portion of the vaporized liquid medium, for example, gaseous unreacted hydrocarbon monomer and/or solvent, may still be present along with the polyolefin solids. For example, vaporized liquid medium may be absorbed in and/or on the polyolefin solids and/or vaporized liquid medium may be present interstitially amongst the polyolefin solids. Further removal of this vaporized liquid medium present with the polyolefin solids is usually necessary in order to achieve a polyolefin product which, for example, meets various environmental regulations and avoids loss of valuable unreacted hydrocarbon monomer and/or solvent. Typically, vaporized liquid medium may be removed by exposing polyolefin solids to an inert purge gas, such as nitrogen, which can strip away evolving or desorbing gas from the polyolefin solids. However, such a separation step involves the introduction of an inert gas, which needs to be removed via another separation step or by venting the inert gas, along with unreacted hydrocarbon monomer and/or solvent, to a flare or fuel system. Alternatively, vaporized liquid medium may be removed by allowing it to desorb from polyolefin solids, for example, in a dryer that can convey the polyolefin solids horizontally via a mechanical mechanism while heat is added to the polyolefin solids. Overall, both use of an inert purge gas, such as nitrogen, and the use of a dryer to allow for desorption of the vaporized liquid medium can contribute to additional operating and/or capital cost due to additional process steps needed and potential loss of valuable unreacted hydrocarbon monomer and/or solvent as well as impacting process reliability. Therefore, there is a need for new methods for removal of vaporized liquid medium, for example, gaseous unreacted hydrocarbon monomer and/or solvent, from polyolefin solids that can avoid or limit introduction of inert purge gases as well as avoid loss of valuable unreacted hydrocarbon monomer and/or solvent.

Related publications include EP 3 075 749 A1; EP 2 743 279 A1; EP 2 172 494 A1; WO 93/13843; US 2006/135631; US 2009/071414; and U.S. Pat. No. 7,098,301 Bi.

SUMMARY OF THE INVENTION

It has been discovered that gaseous components, such as gaseous unreacted hydrocarbon monomer and/or solvent, can be removed from polyolefin solids by increasing residence time of a stream comprising polyolefin solids and gaseous components within a gas-solid separation vessel. This increase in residence time may be achieved by flowing a stream comprising polyolefin solids and gaseous components through a portion of a gas-solid separation vessel having a volume sufficient to increase residence time of the polyolefin solids present in the stream within the gas-solid separation vessel. Advantageously, such a method can avoid loss of valuable hydrocarbon monomer and/or solvent, and instead can produce a stream of unreacted hydrocarbon monomer and/or solvent, which may be recycled for use in a polymerization process.

Disclosed herein is a method for separating gaseous unreacted hydrocarbon monomer and/or solvent from polyolefin solids. The method comprises (or consists of, or consists essentially of) flowing a first stream comprising polyolefin solids and gaseous unreacted hydrocarbon monomer and/or solvent through a portion of a gas-solid separation vessel having a volume sufficient so that polyolefin solids present within the first stream have a residence time within the gas-solid separation vessel ≥about 5.0 minutes to separate gaseous unreacted hydrocarbon monomer and/or solvent from the polyolefin solids to produce a second stream comprising polyolefin solids substantially free of gaseous unreacted hydrocarbon monomer and/or solvent and a third stream comprising the gaseous unreacted hydrocarbon monomer and/or solvent.

Additionally disclosed is a system for separating gaseous unreacted hydrocarbon monomer and/or solvent from polyolefin solids. The system comprises (or consists of, or consists essentially of) at least one reactor for polymerizing a hydrocarbon monomer, optionally with a liquid solvent, in the presence of a catalyst to produce an effluent stream. A feedstream is in fluid connection with the at least one reactor, wherein the feedstream comprises hydrocarbon monomer and optionally, the liquid solvent. A catalyst stream is in fluid connection with the at least one reactor, and the effluent stream is in fluid connection with the at least one reactor, wherein the effluent stream comprises a slurry of polyolefin solids in a liquid medium. The system further comprises a liquid-solid separator in fluid connection with the at least one reactor for separating at least a portion of the liquid medium from the polyolefin solids to produce a gas-solids stream and a first vapor stream. The effluent stream is in fluid connection with the liquid-solid separator.

The first vapor stream is in fluid connection the liquid-solid separator, wherein the first vapor stream comprises at least a first portion of a vaporized liquid medium. The gas-solids stream is in fluid connection with the liquid-solid separator, wherein the gas-solids stream comprises the polyolefin solids and at least a second portion of the vaporized liquid medium comprising gaseous unreacted hydrocarbon monomer and/or solvent. The system further comprises (or consists of, or consists essentially of) a gas-solid separator in fluid connection with the liquid-solid separator, wherein the gas-solid separator has a volume sufficient so that polyolefin solids present within the gas-solids stream has a residence time within the gas-solid separator ≥about 5.0 minutes to separate the second portion of the vaporized liquid medium from the polyolefin solids and to produce a solids stream comprising polyolefin solids substantially free of the second portion of the vaporized liquid medium and a second vapor stream comprising the second portion of the vaporized liquid medium. The gas-solids stream is in fluid connection with the gas-solid separator. The solids stream is in fluid connection with the gas-solid separator and the second vapor stream is in fluid connection with the gas-solid separator.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE INVENTION

I. Definitions

Figure 1:
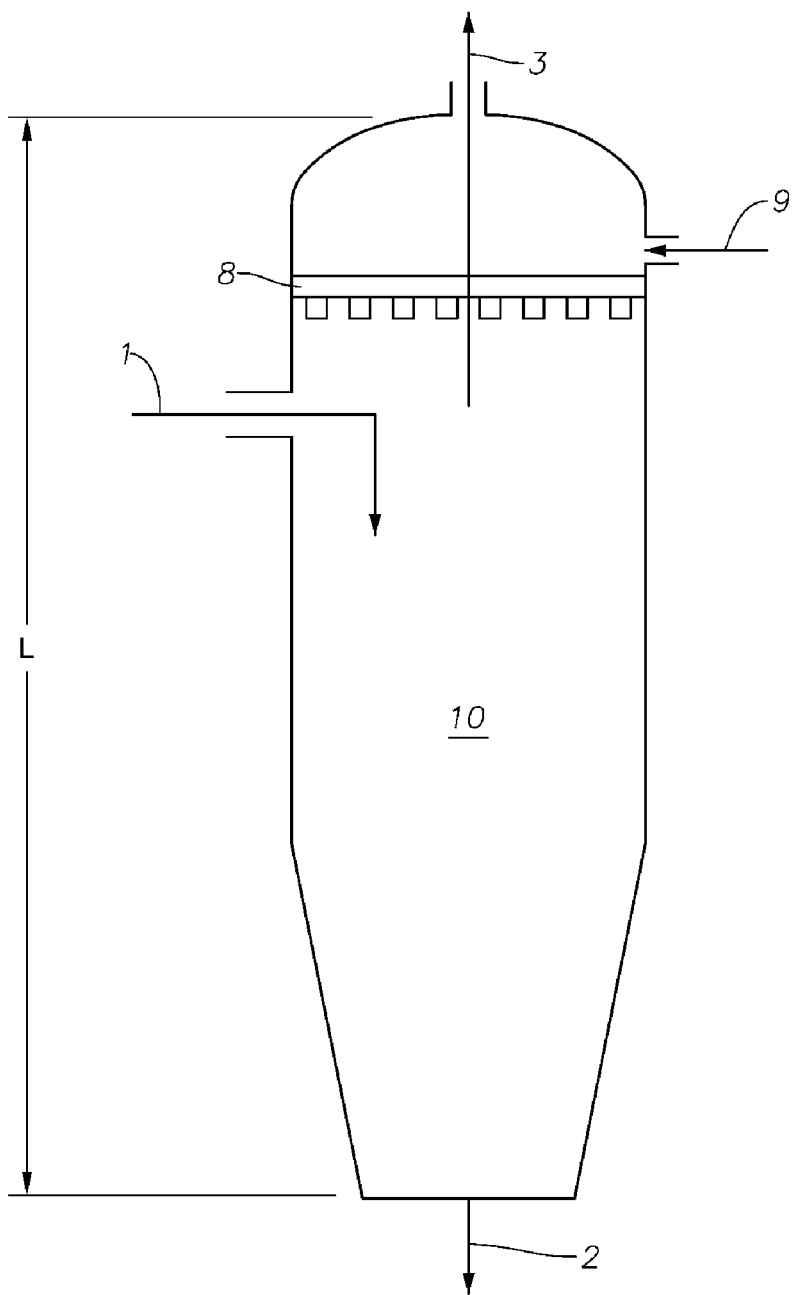
FIG. 1 illustrates a gas-solid separation vessel according to certain aspects of the present disclosure.

For the purposes of this disclosure, the following definitions will apply, unless otherwise stated.

As used in the present disclosure and claims, the singular forms "a," "an," and "the" include plural forms unless the context clearly dictates otherwise.

The term "and/or" as used in a phrase such as "A and/or B" herein is intended to include "A and B", "A or B", "A", and "B".

As used herein, the phrase "at least a portion of" means ≥0 to 100.0 wt % of the composition to which the phrase refers. The phrase "at least a portion of" refers to an amount ≤about 1.0 wt %, ≤about 2.0 wt %, ≤about 5.0 wt %, ≤about 10.0 wt %, ≤about 20.0 wt %, ≤about 25.0 wt %, ≤about 30.0 wt %, ≤about 40.0 wt %, ≤about 50.0 wt %, ≤about 60.0 wt %, ≤about 70.0 wt %, ≤about 75.0 wt %, ≤about 80.0 wt %, ≤about 90.0 wt %, ≤about 95.0 wt %, ≤about 98.0 wt %, ≤about 99.0 wt %, or ≤about 100.0 wt %. Additionally or alternatively, the phrase "at least a portion of" refers to an amount ≥about 1.0 wt %, ≥about 2.0 wt %, ≥about 5.0 wt %, ≥about 10.0 wt %, ≥about 20.0 wt %, ≥about 25.0 wt %, ≥about 30.0 wt %, ≥about 40.0 wt %, ≥about 50.0 wt %, ≥about 60.0 wt %, ≥about 70.0 wt %, ≥about 75.0 wt %, ≥about 80.0 wt %, ≥about 90.0 wt %, ≥about 95.0 wt %, ≥about 98.0 wt %, ≥about 99.0 wt %, or about 100.0 wt %. Ranges expressly disclosed include combinations of any of the above-enumerated values; e.g., about 10.0 to about 100.0 wt %, about 10.0 to about 98.0 wt %, about 2.0 to about 10.0 wt %, about 40.0 to 60.0 wt %, etc.

As used herein, the term "polymer(s)" refers to homopolymers, copolymers, terpolymers, and interpolymers. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

As used herein, the term "polymerization" includes homopolymerization, copolymerization, terpolymerization, and interpolymerization.

A "reaction zone" also referred to as a "polymerization zone" is a vessel where polymerization takes place, for example a batch reactor, a continuous reactor, a gas phase reactor, a fluidized bed reactor, a loop reactor, a stirred tank reactor and combinations thereof. When multiple reactors are used in either series or parallel configuration, each reactor may be considered as a separate reaction zone or a separate polymerization zone. Alternatively, a reactor may include one or more reaction zones or polymerization zones. For a multi-stage polymerization, each polymerization stage is considered as a separate polymerization zone.

As used herein, the term "polymerization slurry" means substantially a two phase composition including polymer solids and liquid, for example, which may be circulating within a reactor, e.g., a loop reactor. The solids can include catalyst and a polymerized olefin, such as polyethylene and/or polypropylene. The liquids can include unreacted hydrocarbon monomer, a solvent, also known as a diluent, for example with dissolved monomer, comonomer, molecular weight control agents, such as hydrogen, antistatic agents, antifouling agents, scavengers, and/or other process additives.

As used herein, when a polymer is referred to as comprising a monomer, the monomer is present in the polymer in the polymerized form of the monomer or in the derivative form of the monomer.

The terms "polypropylene," "polypropylene polymer(s)," and "propylene polymer(s)" refer to homopolymers, copolymers, terpolymers, and interpolymers made from propylene derived units, or combinations of these. The term "polypropylene" may be defined to mean any propylene based polymer having a propylene content of at least 50 wt %. As used herein, "polypropylene" can include homopolymers of propylene derived units and copolymers of propylene derived units.

In some embodiments, the polypropylene(s) may be isotactic. As used herein, "isotactic" is defined as having at least 40% isotactic pentads according to analysis by $^{13}C$ NMR. Isotacticity of the propylene sequences in polypropylene can be achieved by polymerization with the choice of a desirable catalyst composition. In one embodiment, the isotacticity of the polypropylene(s) as measured by $^{13}C$ NMR, and expressed as meso diad content is greater than 90% (meso diads [m]>0.90) or 95% or 97% or 98% in certain embodiments, determined as in U.S. Pat. No. 4,950,720 by $^{13}C$ NMR. Expressed another way, the isotacticity of the polypropylenes as measured by $^{13}$C NMR, and expressed as pentad content, is greater than 93% or 95% or 97% in certain embodiments.

The terms "polyethylene," "polyethylene polymer(s)," and "ethylene polymer(s)" refer to homopolymers, copolymers, terpolymers, and interpolymers made from ethylene derived units, or combinations of these. The term "polyethylene" may be defined to mean any ethylene based polymer having an ethylene content of at least 50 wt %. As used herein, "ethylene" can include homopolymers of ethylene derived units and copolymers of ethylene derived units.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer.

As used herein, Mn is number average molecular weight, Mw is weight average molecular weight, and Mz is z-average molecular weight, wt % is weight percent, and mol % is mole percent. Molecular weight distribution (MWD) is defined to be Mw divided by Mn. Unless otherwise noted, all molecular weight units (e.g., Mn, Mw, Mz) are g/mol.

As used herein, the term "counter-current" refers to a flow of two streams (e.g., stream (a), stream (b)) in substantially opposing directions. For example, if stream (a) flows from an upper portion to a lower portion of a vessel or at least one reaction zone and stream (b) flows from a lower portion to an upper portion of the vessel or the at least one reaction zone, the flow of stream (a) would be considered counter-current to the flow of stream (b). On a smaller scale within the vessel or reaction zone, there may be regions where flow may not be counter-current.

As used herein, the term "co-current" refers to a flow of two streams (e.g., stream (a), stream (b)) in substantially the same direction. For example, if stream (a) flows from an upper portion to a lower portion of at least one reaction zone and stream (b) flows from a an upper portion to a lower portion of at least one reaction zone, the flow of stream (a) would be considered co-current to the flow of stream (b). On a smaller scale within the reaction zone, there may be regions where flow may not be co-current.

As used herein, the term "residence time" refers to the average duration a polyolefin solids stream (e.g., the first stream) remains within a gas-solid separation vessel.

II. Polymerization Methods Including Methods for Separating Gaseous Components from Polyolefin Solids Polymerization methods are provided herein comprising polymerizing a hydrocarbon monomer in the presence of a catalyst in at least one reaction zone under conditions to produce a slurry comprising polyolefin solids in a liquid medium. Optionally, a liquid solvent may be used during the polymerization. The liquid medium may comprise unreacted hydrocarbon monomer and optionally, solvent.

The polyolefins made by the process herein, preferably polypropylene, are most preferably made using a single catalyst such as a Ziegler-Natta catalyst with one or more activators and/or external electron donors in a slurry polymerization preferably, preferably two external donors whose overall concentration can be varied, and/or they can be varied with respect to one another.

The phrase "slurry polymerization process" refers to a process or reactor that handles polypropylene that is only partly dissolved or not dissolved at all in the medium, either monomer, solvent, or both, typically having at least 20 wt % polypropylene suspended or not dissolved. In a typical solution or slurry polymerization process, catalyst components, solvent, monomers and hydrogen (when used) are passed under pressure to one or more polymerization reactors. Catalyst components may be passed to the polymerization reactor as a mixture in aliphatic hydrocarbon solvent, in oil, a mixture thereof, or as a dry powder. Most preferably, the polymerization process is otherwise carried out using propylene as the medium to carry the components and exchange heat with the environment.

More particularly, the slurry polymerization process used in this invention is a "bulk slurry loop process." Such a process typically uses a polymerization reactors that can include, but are not limited to, a loop reactor, a stirred reactor, or the like, or combinations thereof. In a preferred embodiment, the polymerization reactor may be a loop reactor, such as one described in U.S. Pat. No. 6,239,235, the entire disclosure of which is incorporated herein by reference. In some embodiments, where the polymerization reactor is a loop reactor, the polymerization reactor can comprise at least 2 legs, for example from 2 legs to 16 legs, at least 4 legs, from 4 legs to 16 legs, from 4 legs to 12 legs, from 6 legs to 12 legs, from 6 legs to 10 legs, from 8 legs to 12 legs, or from 4 legs to 8 legs.

In any embodiment, the Ziegler-Natta catalyst, an activator (typically an aluminum alkyl) and external electron donor(s) are fed to a pre-polymerization reactor, either with or without a prior step to premix or "pre-contact" these components to activate the catalyst complex ahead of polymerization. The pre-polymerization reactor serves to start the reaction with the monomer, typically propylene but also ethylene or other $C_4$ to $C_{12}$ olefins, at a low temperature (preferably 10-30° C.) to allow a small amount of polypropylene to grow around the catalyst particles to prevent fracturing, and thus create polypropylene fines which are difficult to process, when this catalyst with polypropylene is subsequently fed into the first main loop reactor along with more monomer and/or comonomers. However, in any embodiment, the pre-polymerization step may be skipped and the catalyst/activator/donors fed directly to the polymerization reactor(s). In any case, there may be one or two or more loop reactors in series or parallel, followed by separation equipment such as described herein to remove remaining monomers from the polypropylene solids which can then be "finished" in either extrusion and pelletization equipment or loaded to containers directly as the material comes from the reactors.

In any embodiment, hydrogen may be present in the reactor to modulate the molecular weight of the polypropylene being produced. In any embodiment, the hydrogen, if combined with the single catalyst during the polymerization, is combined at a constant level. This means that the total concentration of hydrogen in the reactor is held constant during the production of the polypropylene.

The polymerization is most preferably a "single stage" polymerization process, meaning that the olefins and catalyst components, and optional hydrogen are contacted under the same or similar conditions throughout the production of the polypropylene, such as in a single reactor, or multiple reactors in parallel or series, held at a constant level of temperature, pressure, monomer concentration, and hydrogen concentration, where no parameter changes by more than ±5%, or ±10%. Thus, for example, a polymerization is single stage even if performed in two or more loop slurry reactors in parallel if the reactor conditions are held at a constant level. In certain embodiments, the hydrogen concentration can be varied from one loop to the other to effect the molecular weight of the polypropylene being generated.

In any embodiment, the temperature of the reactor is controlled by the rate of catalyst addition (rate of polymerization), the temperature of the monomer feed stream and/or the use of heat transfer systems. For olefin polymerization, reactor temperatures can range from 50 to 120° C. or more, while pressures are generally higher than 300 psig, or within a range from 300 psig to 1000, or 1200 psig. These process conditions are in favor of in-situ catalyst activation since high temperature enhances the solubility of catalysts and activators in propylene. In any embodiment, the polymerization temperature is preferably at least 50, or 60, or 70° C., or within a range from 50, or 60, or 70, or 80, or 90, or 100, or 120° C. to 130, or 140, or 150, or 160, or 170° C.

Prior to mixing, the monomers are generally purified to remove potential catalyst poisons. The feedstock may be heated or cooled prior to delivery to the first reactor. Additional monomers may be added to the second reactor, and it may be heated or cooled.

The catalysts/activators/donors can be passed to one or more polymerization reactors in series or split between two or more reactors in parallel. In slurry polymerization, polypropylene produced remains dissolved or partially dissolved in the liquid monomer under reactor conditions. The catalyst may be passed to the reactor in solid form or as a slurry/suspension in an inert hydrocarbon solvent. Alternatively, the catalyst suspension may be premixed with the solvent in the feed stream for the polymerization reaction. Catalyst can be activated in-line, or by an activator with which it is co-supported. In some instances premixing is desirable to provide a reaction time for the catalyst components prior to entering the polymerization reactor, but this step may be absent. The catalyst activity is preferably 20,000 kg polypropylene per kg of catalyst or more, more preferably 50,000 kg polypropylene per kg of catalyst or more, even more preferably 100,000 kg polypropylene per kg of catalyst or more.

Loop reactor systems include a single reactor and multiple reactors in series or parallel configuration, such as that disclosed in US 2007/0022768. The solvent/monomer, preferably simply propylene, flow in these reactors is typically maintained using pumps and/or pressure systems, and may operate continuously by having monomer and catalyst feed at one point and extracting the forming polypropylene from another point, preferably downstream therefrom. The conditions of temperature, catalyst concentration, hydrogen concentration, and monomer concentration may be the same or different in each loop reactor and may be tailored as necessary to suit the desired end product. In any embodiment, the solution polymerization process of this disclosure uses heat exchanger types of reactors where the polymerization. The reactors can be one or more shell and tube type of heat exchangers, or one or more spiral type of heat exchanger.

Most preferably, no solvents are present in the bulk slurry loop process except for a minor amount used to initially suspend the catalyst and/or activator, and the system consists essentially of propylene and any other monomers as the polymerization medium and carrier of the forming polypropylene particles. In any embodiment the reactor pressure is maintained and/or controlled using a pressurization drum, which is an apparatus containing liquid propylene and fluidly connected to the loop reactor, preferably the first loop, where the propylene is kept under pressure. The pressure of the propylene within the pressurization drum is controlled by steam-heated propylene that can enter above a pool of liquid propylene in the drum.

So called monomer scrubbers (typically, counter-flow liquid/vapor apparatus) and mechanical dryers (typically, batch or continuous blenders such as from Bepex International LLC) are preferably absent from the bulk slurry loop process, and monomer recovery relies upon transfer line dryers and separation systems such as those described herein, preferably a high pressure dust collector or "separator" (at least 200, or 250, or 300 psi), followed by a low pressure separator (1, or 5 psi to 10, or 20, or 50 psi), the geometry and size of which are tailored to increase residence time of the materials to effect separation of liquid propylene from solid polypropylene. Screw compressors, especially flooded screw compressors, may also be used to maintain or alter pressure and convey material. Preferably, propylene is removed from the solid polypropylene by passing both from the loop reactor to a transfer line dryer, preferably continuously, followed by a high pressure separator, followed optionally by another transfer line dryer, then to a low pressure separator. The solid polypropylene that remains is then passed preferably to a purge drum, then the finishing process.

Thus, in any embodiment is a process comprising contacting a catalyst with propylene and optionally ethylene or $C_4$ to $C_{10}$ α-olefins in at least one slurry polymerization reactor to produce polypropylene, wherein the process further comprising (or consisting of, or consisting essentially of) continuously separating the polypropylene from the remaining propylene by first passing the polypropylene and remaining propylene from the reactor(s) to a transfer line dryer to remove a portion of the propylene, preferably continuously, followed by passing the polypropylene and remaining propylene to a high pressure separator (i.e., liquid-solid separator) whereby an amount of the remaining propylene is further separated from a first separated polypropylene and directed towards a recycle line back to the reactor(s), followed by directing the first separated polypropylene to a low pressure separator (i.e., gas-solid separator) whereby any remaining propylene is further separated to obtain a second separated polypropylene and propylene which is directed to a recycle line back to the reactor(s), wherein the second separated polypropylene is passed to a purge drum, then to an extruder to form finished pellets of polypropylene. In any embodiment, the first separated polypropylene and remaining propylene is passed to the low pressure separator through a second transfer line dryer to remove an amount of propylene prior to entering the low pressure separator.

In finishing the polypropylene, one or more conventional additives such as antioxidants can be incorporated in the polypropylene during melt extrusion in one or more extruders. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline, and/or stabilizing agents such as tocopherols or lactones, acid scavengers, and/or other agents as disclosed in WO 2009/007265.

A. Hydrocarbon Monomer

Hydrocarbon monomers useful herein include substituted or unsubstituted $C_2$ to $C_{40}$ olefins, preferably $C_2$ to $C_{20}$ olefins, preferably $C_2$ to $C_{12}$ olefins, preferably $C_2$ to $C_6$ olefins. For example, hydrocarbon monomer can include ethylene, propylene, butene, pentene, hexene, heptene, octene, nonene, decene, undecene, dodecene, and isomers thereof. In particular, the hydrocarbon monomer comprises ethylene and/or propylene, preferably propylene.

Optionally, the hydrocarbon monomer additionally comprises a comonomer, for example, one or more $C_2$ to $C_{40}$ olefins, preferably $C_2$ to $C_{20}$ olefins, or preferably $C_2$ to $C_{12}$ olefins. The $C_2$ to $C_{40}$ olefin comonomers may be linear, branched, or cyclic. The $C_2$ to $C_{40}$ cyclic olefin comonomers may be strained or unstrained, monocyclic or polycyclic, and may optionally include heteroatoms and/or one or more functional groups. Optional comonomers can include, but are not limited to, ethylene, propylene, butene, pentene, 4-methyl-1-pentene, hexene, octene, decene, and combinations thereof.

In some embodiments, the hydrocarbon monomer comprises propylene and optional comonomers comprising one or more $C_2$ olefin (ethylene) or $C_4$ to $C_{40}$ olefins, preferably $C_4$ to $C_{20}$ olefins, or preferably $C_6$ to $C_{12}$ olefins. In some embodiments, a hydrocarbon monomer feed can comprise a majority (greater than 50 wt %) of propylene, preferably at least about 70 wt % propylene, at least about 75 wt % propylene, at least about 80 wt % propylene, at least about 85 wt % propylene, at least about 90 wt % propylene, or at least about 95 wt % propylene. Additionally or alternatively, the monomer feed comprises not more than 99.9 wt % propylene, for example not more than 99.7 wt % propylene, not more than 99.5 wt % propylene, not more than 99.3 wt % propylene, or not more than 99 wt % propylene.

In some embodiments, the hydrocarbon monomer comprises ethylene and optional comonomers comprising one or more $C_3$ to $C_{40}$ olefins, preferably $C_4$ to $C_{20}$ olefins, or preferably $C_6$ to $C_{12}$ olefins. In some embodiments, a hydrocarbon monomer feed can comprises a majority (greater than 50 wt %) of ethylene, preferably at least about 70 wt % ethylene, at least about 75 wt % ethylene, at least about 80 wt % ethylene, at least about 85 wt % ethylene, at least about 90 wt % ethylene, or at least about 95 wt % ethylene. Additionally or alternatively, the monomer feed comprises not more than 99.9 wt % ethylene, for example not more than 99.7 wt % ethylene, not more than 99.5 wt % ethylene, not more than 99.3 wt % ethylene, or not more than 99 wt % ethylene.

It is contemplated herein that the above discussion with regard to "hydrocarbon monomer" applies to the term "unreacted hydrocarbon monomer" as referenced herein, since the term "unreacted hydrocarbon monomer" refers to hydrocarbon monomer which has not been substantially polymerized to produce polyolefins.

B. Polyolefin Solids

In various embodiments, the methods described herein produces polyolefin solids, which may be homopolymers and copolymers of one, two, three, four or more $C_2$ to $C_{40}$ olefin monomers, preferably $C_2$ to $C_{20}$ alpha-olefin monomers. In particular, the methods described herein produce polypropylene and polyethylene homopolymers and copolymers. In a preferred embodiment, the polymers produced are homopolymers of propylene or homopolymers of ethylene. In particular, the polyolefin comprises polyethylene and/or polypropylene.

Alternatively, the polymers produced herein are copolymers of a $C_2$ to $C_{40}$ olefin and one, two, or three or more different $C_2$ to $C_{40}$ olefins, (where the $C_2$ to $C_{40}$ olefins are preferably $C_3$ to $C_{20}$ olefins, preferably $C_3$ to $C_{12}$ alpha-olefin, preferably propylene, butene, hexene, octene, decene, dodecene, preferably propylene, butene, hexene, octane, or a mixture thereof).

In certain variations, the polymers produced herein (e.g., polyethylene, polypropylene) further comprise a $C_2$ to $C_{40}$ comonomer, preferably a $C_2$ to $C_{20}$ comonomer, preferably ethylene, propylene, butene, hexene, octene, decene, undecene, dodecene, or a mixture thereof.

Alternatively, the polymers produced herein are copolymers of propylene preferably having from 0 to 25 mole % (e.g., from 0.5 to 20 mole %, from 1 to 15 mole %, preferably from 3 to 10 mole %) of one or more of $C_2$ or $C_4$ to $C_{20}$ olefin comonomers (preferably ethylene or $C_4$ to $C_{12}$ alpha-olefin, preferably ethylene, butene, hexene, octene, decene, dodecene, preferably ethylene, butene, hexene, octene).

Alternatively, the polymers produced herein are copolymers of ethylene preferably having from 0 to 25 mole % (e.g., from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In some embodiments, the polymers produced herein are impact copolymers. As used herein, the term "impact copolymer" refers to two or more polymers in which one polymer may be dispersed in the other polymer, typically one polymer comprising a matrix phase and the other polymer comprising an elastomer phase. The matrix polymer may be a crystalline polymer, e.g., polypropylene homopolymer or polypropylene copolymer, and the polymer comprising the elastomer phase may be a rubber or elastomer. The polymer that forms the elastomer phase can comprises between about 5 and about 50, between about 10 and 45 and between about 10 and 40 wt % of the impact polymer. Exemplary impact copolymers can include blends of propylene homopolymer and propylene/ethylene copolymer (i.e., a poly(propylene-co-propylene/ethylene impact copolymer). Impact copolymers can be produced by mechanical blending or through the use of multi-stage reactors. Usually impact copolymers are formed in a dual or multi-stage process.

Typically, the polymers produced herein have a $M_w$ of 20,000 to 1,000,000 g/mol (preferably 25,000 to 750,000 g/mol, preferably 50,000 to 500,000 g/mol), and/or a $M_w/M_n$ of greater than 1.9 to less than 40 (alternately 1.9 to 20, alternately 1.9 to 10). Unless otherwise indicated $M_w$, $M_n$, and $M_w/M$ are determined by GPC as described in WO 2017/095501.

The polyolefins may further comprise additives. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

C. Optional Solvent

The optional solvent (or diluent) may be useful herein is typically inert to (or at least relatively unreactive in) the polymerization reaction and is typically liquid under the reaction conditions present in the at least one reaction zone. Examples of such solvents can include, but are not limited to, hydrocarbons such as propane, butane, isobutane, pentane, isopentane, neopentane, hexane, cyclohexane, and combinations thereof. Additional or alternative examples of solvents useful herein can be found in Hogan et al., "Phillips Petroleum Company Loop Reactor Polyethylene Technology," 39 *J. Appl. Polym. Sci.: Appl. Polym. Symp.*, 49-60 (1981).

D. Catalysts

Useful catalysts typically include those which are useful generally in slurry-type polymerization reactors, e.g. single site and/or multi-site catalysts relatively insoluble in the slurry diluent, such as metal oxide-based catalysts, Ziegler/Natta-type catalysts, metallocene catalysts, and combinations thereof. In some embodiments, a mixed system catalyst may be used, such as for example a catalyst comprising both a metallocene and a Ziegler/Natta-type catalyst. In other embodiments, the catalyst may be bimetallic, such as for example a catalyst comprising a metallocene and a Ziegler/Natta-type catalyst on the same support. Most preferably, a Zielger-Natta catalyst is used, in particular, a single Ziegler-Natta catalyst.

In any embodiment the Ziegler-Natta catalyst preferably includes a solid titanium catalyst component comprising titanium as well as magnesium, halogen, at least one non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein "R" is a hydrocarbyl radical, "X" is a halogen atom, and n is from 0 to 4. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{21}$ radicals that may be linear, branched, or cyclic where appropriate (aromatic or non-aromatic).

Preferably, the halogen-containing titanium compound is a titanium tetrahalide, or titanium tetrachloride. Preferably, the magnesium compound to be used in the preparation of the solid titanium catalyst component includes a magnesium compound having reducibility (or capable of alkyl substitution) and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. In combination with the magnesium compound, the titanium-based Ziegler-Natta catalyst is said to be supported, thus the solid part of the catalyst.

In any embodiment the Ziegler-Natta catalysts are used in combination with an activator, also referred to herein as a Ziegler-Natta activator. Compounds containing at least one aluminum-carbon bond in the molecule may be utilized as the activators, also referred to herein as an organoaluminum activator. Suitable organoaluminum compounds include organoaluminum compounds of the general formula $R^1{}_mAl(OR^2)_nH_pX_q$, wherein $R^1$ and $R^2$ are identical or different, and each represents a $C_1$ to $C_{15}$ hydrocarbyl radical, or $C_1$ to $C_4$ hydrocarbon radical; "X" represents a halogen atom; and "m" is 1, 2, or 3; "n" is 0, 1, or 2; "p" is 0, 1, 2, or 3; and "q" is 0, 1, or 2; and wherein m+n+p+q=3. Other suitable organoaluminum compounds include complex alkylated compounds of metals of Group I of the Period Table (lithium, etc.) and aluminum represented by the general formula $M^1AlR^{14}$, wherein $M^1$ is the Group I metal such as Li, Na, or K, and $R^1$ is as defined above. Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesqui-ethoxide and butyl aluminum sesqui-butoxide.

Electron donors are present with the metal components described above in forming the catalyst suitable for producing the polypropylenes described herein. Both "internal" and "external" electron donors are desirable for forming the catalyst suitable for making the polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids, any of which may include an aromatic group. The internal electron donors are typically part of the solid catalyst component, while the external electron donors are typically added separately from the solid catalyst component.

In any embodiment the one or more internal donors are non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof. Even more preferably, the non-aromatic internal electron donor(s) comprise a substituted or unsubstituted $C_4$ to $C_{10}$ or $C_{20}$ di-, tri-, or tetra-ether or glycol, a substituted or unsubstituted $C_4$ to $C_{10}$ or $C_{20}$ carboxylic acid or carboxylic acid ester that may include one or more ether groups, or a combination of two or more such compounds. By "substituted" what is meant is that the compound may include groups such as hydroxides, amines, silanes, or a combination thereof. In any embodiment, the one or more compounds includes secondary or tertiary carbon atoms (thus iso- or tert-hydrocarbon compounds). Such compounds are described in, for example, U.S. Pat. Nos. 5,877,265 and 8,344,079.

In any embodiment, two or more external electron donors are used in combination with the solid Ziegler-Natta catalyst component. The external electron donors may comprise an organic silicon compound of the general formula $R^1{}_nSi(OR^2)_{4-n}$ or $R^1{}_nSi(NR_2{}^2)_{4-n}$, wherein $R^1$ and $R^2$ independently represents a hydrogen or hydrocarbyl radical and "n" is 1, 2, or 3. Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, [gamma]-chloropropyltri-methoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbomanemethyldimethoxysilane, ethyl silicate, butyl silicate, trimethyl-phenoxysilane, methylallyloxysilane, vinyltris(beta-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

Preferably the external electron donors are selected from any one or more of methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane cyclohexyltrimethoxysilane, tetraethoxysilane, methylcyclohexyldimethoxysilane, propyltriethoxysilane, and/or dicyclopentyldimethoxysilane.

In any embodiment, the production of the polypropylene preferably includes the use of two external electron donors, most preferably simultaneously. Suitable methods for using such external electron donors is disclosed in U.S. Pat. Nos. 6,087,459, and 6,686,433. The two external electron donors may be selected from any of the external electron donors described herein. But in a particular embodiment, the first external electron donor has the formula $R^{12}Si(OR^2)_2$, wherein each $R^1$ is independently a $C_1$ to $C_{10}$ hydrocarbyl radical in which the carbon adjacent to the silicon atom is a secondary or a tertiary carbon atom, and wherein each $R^2$ is independently a $C_1$ to $C_{10}$ hydrocarbyl radical; and the second external electron donor has the formula $R^3{}_nSi(OR^4)_{4-n}$, wherein each $R^3$ and $R^4$ are independently a $C_1$ to $C_{10}$ hydrocarbyl radical, and "n" is 1, 2, or 3; wherein the second external electron donor is different than the first external electron donor. The combined concentration of external electron donors can be present with the catalyst and monomer(s) in the reactor to within a range from 10, or 20 ppm to 80, or 100, or 120 ppm.

The concentration of the catalyst components in the polymerization may be from 0.01 to 200 millimoles, or more preferably from 0.05 to 100 millimoles, calculated as a titanium atom, per liter of an inert hydrocarbon medium. The organoaluminum activator may be present in an amount sufficient to produce from 0.1 to 500 g, or more preferably from 0.3 to 300 g, of a polypropylene per gram of the titanium catalyst present, and may be present at from 0.1 to 100 moles, or more preferably from 0.5 to 50 moles, per mole of the titanium atom present in the catalyst component.

E. Liquid-Solid Separation Step

One or more separation steps, e.g., liquid-solid separation steps, may be performed on the slurry comprising polyolefin solids in a liquid medium to separate the polyolefin solids from the liquid medium to produce a first stream comprising polyolefin solids prior to flowing the first stream through a gas-solid separation vessel having a volume sufficient to increase residence time of the first stream (as described herein). For example, the slurry may be subjected to a reduction in pressure so that the liquid medium may vaporize leaving concentrated polymer solids. In some instances, the reduction in pressure can occur, for example, through a flash line and in a flash tank to produce the first stream. In some embodiments the flash line may comprise a heat exchanger or steam jacketed pipe to introduce energy for facilitating the vaporization of the liquid medium. Additionally or alternatively, the reduction in pressure can occur in a first flash tank and a further reduction may occur in a second flash tank to produce the first stream.

The final pressure for the flash step can vary depending on the nature of the liquid medium, e.g., unreacted hydrocarbon monomers and optional solvent, and the temperature of the slurry. Typically, the pressure in the flash tank is greater than or equal to 150 psia (1.03 MPa). In some embodiments, pressures in the range of from about 150 psia to about 400 psia (MPa to 2.76 MPa) can be employed, or in the range of 150 psia to 315 psia (0.76 MPa to 2.17 MPa).

The vaporized liquid medium produced in the flash tank(s) can be collected, condensed, and recycled back to the at least one reaction zone.

It is contemplated herein that the first stream comprising polyolefin solids may be produced following an additional polymerization step after the liquid-solid separation step. For example, after the liquid-solid separation step described above, the polyolefin solids may be introduced into another reaction zone along with additional hydrocarbon monomer, the same or different from the initial hydrocarbon monomer used, to produce a first stream comprising polyolefin solids stream. This further reaction zone may be at least one gas phase reactor (which may comprise any number of fluidized beds) fluidly connected and arranged in series, meaning that fluids and gases are allowed to flow from one reactor to another to carry polymer, monomer, catalyst and/or other gases such as hydrogen in such a manner that polymerization can occur in, for example, the slurry reactor and then can continue in, for example, the gas phase reactor.

Thus, in some embodiments, particularly when producing an impact copolymer, the polymerization may be carried out in at least a two stage process, whereby at least one reactor (e.g., slurry loop reactor) is used to make a homopolymer, such as propylene homopolymer solids, and another reactor (e.g., gas phase reactor, preferably a fluidized bed gas phase reactor) is used to make a copolymer, such as a propylene/ethylene copolymer. For example, a homopolymer, e.g., propylene homopolymer solids, produced in a slurry loop reactor, following removal of at least a portion the liquid medium in a liquid-solid separation step, may be provided to a gas phase reactor where the copolymer, e.g., propylene/ethylene copolymer, is produced resulting in an impact copolymer.

F. Gas-Solids Separation Step

1. Residence Time

After liquid medium is separated from the polyolefin solids, for example, during the liquid-solid separation step described above, and optionally, after a further polymerization step in a gas phase reactor as described above, gaseous components including the vaporized liquid medium may remain with the polyolefin solids. Thus, the first stream comprising polyolefin solids may also comprise vaporized liquid medium, e.g., gaseous unreacted hydrocarbon monomer and/or solvent. For example, vaporized liquid medium may be absorbed in and/or on the polyolefin solids and/or vaporized liquid medium may be present interstitially amongst the polyolefin solids.

Thus, methods for separating gaseous components, e.g., vaporized liquid medium comprising gaseous unreacted hydrocarbon monomer and/or solvent, from polyolefin solids are provided herein. The methods may comprise increasing the residence time of the first stream, particularly polyolefin solids present in the first stream, within the gas-solid separation vessel to further promote removal of gaseous unreacted hydrocarbon monomer and/or solvent from the first stream. It is contemplated herein that the residence time of the polyolefin solids refers to the residence time of the bulk of the polyolefin solids. As used herein, "bulk" refers to at least a majority portion of polyolefin solids flowing through a gas-solid separation vessel, e.g., portions of at least about 50.0 wt %, at least about 60.0 wt %, at least about 70.0 wt %, at least about 80.0 wt %, at least about 90.0 wt %, at least about 95.0 wt %, at least about 99.0 wt %, and about 100.0 wt %, based on total weight of the polyolefin solids.

In various embodiments, the methods may further comprise flowing the first stream through a portion of the gas-solid separation vessel having a volume sufficient so that polyolefin solids present in the first stream have an increased residence time within the gas-solid separation vessel to separate gaseous unreacted hydrocarbon monomer and/or solvent from the polyolefin solids to produce a second stream comprising polyolefin solids substantially free of gaseous unreacted hydrocarbon monomer and/or solvent and a third stream comprising the gaseous unreacted hydrocarbon monomer and/or solvent. Optionally, the third stream may be advantageously recycled for use during polymerization and/or for use as the first purge gas (as described below). As used herein, the term "substantially free" should be understood to mean ≤about 10 wt %, ≤about 5.0 wt %, ≤about 1.0 wt %, ≤about 0.10 wt %, ≤about 0.010 wt %, ≤about 0.0010 wt % or about 0.0 wt % of gaseous unreacted hydrocarbon monomer and/or solvent present in the second stream, based on total weight of the second stream. For example, with reference to FIG. 1, a first stream 1 comprising polyolefin solids and gaseous unreacted hydrocarbon monomer and/or solvent may enter a gas-solid separation vessel 10. The gas-solid separation vessel 10 may have a sufficient volume, for example, by having a sufficient length (L), to allow the first stream 1 to have an increased residence time within the gas-solid separation vessel 10 to produce a second stream 2 comprising polyolefin solids substantially free of gaseous unreacted hydrocarbon monomer and/or solvent and third stream 3 comprising the gaseous unreacted hydrocarbon monomer and/or solvent.

In various embodiments, a portion of the gas-solid separation vessel may have a volume sufficient so that the first stream has an increased residence time within the gas-solid separation vessel ≥about 5.0 minutes, ≥about 7.5 minutes, ≥about 10 minutes, ≥about 12.5 minutes, ≥about 15 minutes, ≥about 17.5 minutes, ≥about 20 minutes, ≥about 22.5 minutes, ≥about 25 minutes, ≥about 27.5 minutes, or ≥about 30 minutes. In particular, the gas-solid separation vessel may have a volume sufficient so that the first stream has a residence time within the gas-solid separation vessel ≥about 5.0 minutes or ≥about 10 minutes. Additionally or alternatively, the gas-solid separation vessel may have a volume sufficient so that the first stream has a residence time within the gas-solid separation vessel of about 1 minute to about 30 minutes, about 2.5 minutes to about 25 minutes, about 5.0 minutes to about 25 minutes or about 5.0 minutes to about 20 minutes. It is contemplated herein that any suitable dimension (e.g., length, radius, width, angle of sidewall, height) and/or combination of dimensions of the gas-solid separator may be adjusted as understood by a person of ordinary skill to arrive at a sufficient volume in order to achieve desired residences times as described herein. For example, suitable lengths of the gas-solid separator to achieve a sufficient volume include, but are not limited to ≥1.0 meter, ≥2.5 meters, ≥5.0 meters, ≥7.5 meters, ≥10 meters, ≥12.5 meters, ≥15 meters, ≥17.5 meters, or ≥20 meters.

It is contemplated herein that the gas-solid separation vessel may be any suitable configuration conducive for allowing gaseous unreacted hydrocarbon monomer and/or solvent to be removed from the first stream, e.g., by desorbing from the polyolefin solids as the first stream flows through the gas-solid separator. For example, one or more portions of the gas-solid separator may be angled (e.g., about 25° to about 40°), such as to be in the form a cone shape, and/or the gas-solid separator may comprise baffles. In some embodiments, the gas-solid separator may have a cylindrical portion and/or a conical portion. Examples of suitable gas-solid separation vessels include, but are not limited to a dust collector or a baghouse.

In various aspects, the first stream may enter at an upper portion of the gas-solid separation vessel, the second stream may exit at a lower portion of the gas-solid separation vessel, and the third stream may exit at an upper portion of the gas-solid separation vessel. Additionally or alternatively, the third stream may exit the gas-solid separation vessel at a position above where the first stream enters the gas-solid separation vessel.

In various embodiments, the gas-solid separator may further comprise a medium, such as a filter or a filtration sock, which may be present above an inlet for providing the first stream. The medium may capture solids present in the third stream prior to the third stream exiting the gas-solid separation vessel. The method may further comprise providing a blowback stream to the gas-separation vessel, for example, which may be provided to flush out any trapped solids in the medium. The blowback stream may comprise hydrocarbon monomer as described herein and/or solvent as described herein. The blowback stream may be optionally heated to a suitable temperature prior to entering the gas-solid separation vessel, preferably below the melting point temperature of the polyolefin. In some embodiments, the blowback stream may have a temperature ≥about 70° C., ≥about 75° C., ≥about 80° C., or ≥about 85° C., for example, when entering the gas-solid separation vessel. In some embodiments, the blowback stream may enter at an upper portion of the gas-solid separation vessel, for example, above the medium and the first stream may enter at an upper portion of the gas-solid separation vessel, for example, below the medium. Additionally, the second stream may exit at a lower portion of the gas-solid separation vessel, and the third stream may exit at an upper portion of the gas-solid separation vessel, for example, above the medium. For example, with reference to FIG. 1, a medium 8 may be present in a gas-solid separation vessel 10, preferably above an inlet for providing the first stream 1, below an inlet for providing a blowback stream 9, and below an outlet for the third stream 3.

In some embodiments, the gas-solid separation may be performed at a temperature below the melting point temperature of the polyolefin solids. For example, if the polyolefin solids comprise primarily polypropylene, the gas-solid separation may be performed at a temperature ≤about 160° C., ≤about 140° C., ≤about 120° C., ≤about 100° C., or ≤about 90° C. If the polyolefin solids comprise primarily polyethylene, the gas-solid separation may be performed at a temperature ≤about 180° C., ≤about 160° C., ≤about 140° C., ≤about 120° C., or ≤about 100° C. Additionally or alternatively, the gas-solid separation may be performed at lower pressures, for example, ≤about 25 psig (about 172 kPa), ≤about 20 psig (about 137 kPa), ≤about 15 psig (about 103 kPa), ≤about 10 psig (about 68 kPa), or ≤about 5.0 psig (about 34 kPa). Additionally or alternatively, the gas-solid separation may be performed at a pressure of about 5.0 psig (about 34 kPa) to about 25 psig (about 172 kPa), about 5.0 psig (about 34 kPa) to about 20 psig (about 137 kPa), about 5.0 psig (about 34 kPa) to about 15 psig (about 103 kPa) or about 5.0 psig (about 34 kPa) to about 10 psig (about 68 kPa).

In some embodiments, the second stream may comprise unreacted hydrocarbon monomer and/or solvent, based on total weight of the second stream, in an amount ≤about 10 wt %, ≤about 5.0 wt %, ≤about 1.0 wt %, ≤about 0.10 wt %, ≤about 0.010 wt %, ≤about 0.0010 wt % or about 0.0 wt %. For example, the second stream may comprise unreacted hydrocarbon monomer and/or solvent, based on total weight of the second stream, in an amount of about 0.0 wt % to about 10 wt %, about 0.0 wt % to about 5.0 wt %, about 0.0 wt % to about 1.0 wt %, about 0.0 wt % to about 0.10 wt %, about 0.0 wt % to about 0.010 wt %, or about 0.0 wt % to about 0.0010 wt %. Additionally or alternatively, the third stream may comprise polyolefin solids, based on total weight of the third stream, in an amount ≤about 5.0 wt %, ≤about 1.0 wt %, ≤about 0.10 wt %, ≤about 0.010 wt %, ≤about 0.0010 wt % or about 0.0 wt %. For example, the third stream may comprise polyolefin solids, based on total weight of the third stream, in an amount of about 0.0 wt % to about 10 wt %, about 0.0 wt % to about 5.0 wt %, about 0.0 wt % to about 1.0 wt %, about 0.0 wt % to about 0.10 wt %, about 0.0 wt % to about 0.010 wt %, or about 0.0 wt % to about 0.0010 wt %.

2. Purge Gas

Additionally or alternatively, the methods described herein may further comprise contacting the first stream comprising polyolefin solids and gaseous unreacted hydrocarbon monomer and/or solvent with a first purge gas in a gas-solid separation vessel to further promote removal of gaseous unreacted hydrocarbon monomer and/or solvent from the first stream.

In various aspects, the first purge gas may be heated by any suitable means (e.g., heat exchanger and/or by energy of compression) to achieve a suitable temperature for promoting removal of gaseous unreacted hydrocarbon monomer and/or solvent from the first stream. Preferably, the first purge gas may have a temperature below the melting point temperature of the polyolefin solids. For example, the first purge gas may have a temperature ≥about 70° C., ≥about 75° C., ≥about 80° C., ≥about 85° C., or ≥about 100° C. for example, when entering the gas-solid separation vessel. In particular, the first purge gas may have a temperature ≥about 80° C. or ≥about 85° C. Additionally or alternatively, the first purge gas may have a temperature substantially the same as or greater than about 5 or 10 degrees of the temperature of the first stream entering the gas-solid separation vessel. In some embodiments, the first stream may have a temperature below the melting point temperature of the polyolefin solids. For example, the first stream may have a temperature ≥about 70° C., ≥about 75° C., ≥about 80° C., ≥about 85° C., or ≥about 100° C. for example, when entering the gas-solid separation vessel. Optionally, the first stream may be heated by any suitable means (e.g., heat exchanger or steam jacketed pipe) to achieve the above-described temperature prior to entering the gas-solid separation vessel.

In various aspects, the first purge gas comprises hydrocarbon monomer (e.g., propylene, ethylene, etc.) as described herein and/or a solvent as described herein. The hydrocarbon monomer and/or solvent used in the first purge gas may be fresh or recycled from another stream during the polymerization process. In some embodiments, the first purge gas does not comprise any additional gases, which may require further removal and/or lead to loss of valuable unreacted hydrocarbon monomer and/or solvent, such as inert gases, e.g., nitrogen, etc.

Figure 2A:
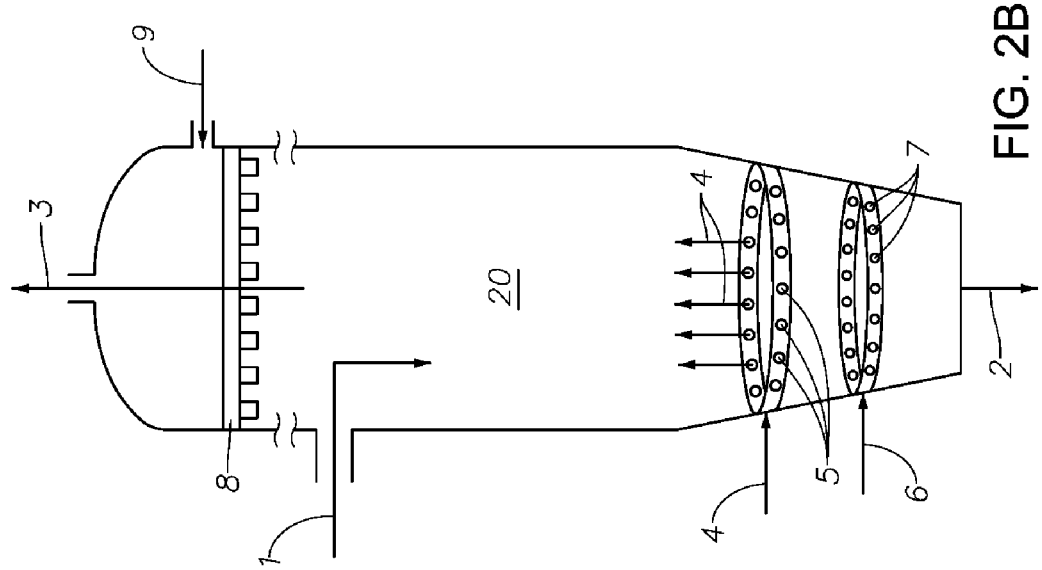
FIGS. 2A and 2B each illustrate an alternative gas-solid separation vessel according to certain aspects of the present disclosure.

In some embodiments, the first purge gas may enter the gas-solid separation vessel through a first plurality of inlets. In some embodiments, the first plurality of inlets may be optionally present along a perimeter of the gas-solid separation vessel. The plurality of inlets may be any suitable shape including, but not limited to circular, rectangular, elliptical, slits, etc. For example, with reference to FIG. 2A, a first stream 1 comprising polyolefin solids and gaseous unreacted hydrocarbon monomer and/or solvent may enter a gas-solid separation vessel 15. The first stream 1 may be contacted with a first purge gas stream 4 to produce a second stream 2 comprising polyolefin solids substantially free of gaseous unreacted hydrocarbon monomer and/or solvent and third stream 3 comprising the gaseous unreacted hydrocarbon monomer and/or solvent. The first purge gas 4 may enter the gas-solid separation vessel 10 through a first plurality of inlets 5.

Additionally or alternatively, the methods described herein, can further comprise contacting the first stream with a second purge gas. In various aspects, the second purge gas may be heated by any suitable means (e.g., heat exchanger) to achieve a suitable temperature for further promoting removal of gaseous unreacted hydrocarbon monomer and/or solvent from the first stream. Preferably, the second purge gas may have a temperature below the melting point temperature of the polyolefin solids. For example, the second purge gas may have a similar temperature as discussed above for the first purge gas, e.g., ≥about 70° C., ≥about 75° C., ≥about 80° C., or ≥about 85° C., when entering the gas-solid separation vessel.

In various aspects, the second purge gas comprises one or more of a hydrocarbon monomer (e.g., propylene, ethylene, etc.) as described herein, a solvent as described herein and/or an inert gas, such as nitrogen. The hydrocarbon monomer and/or solvent used in the second purge gas may be fresh or is preferably recycled from another stream during the polymerization process or has been diluted with an inert gas, such as nitrogen, as required by another step in the polymerization process.

Figure 2B:
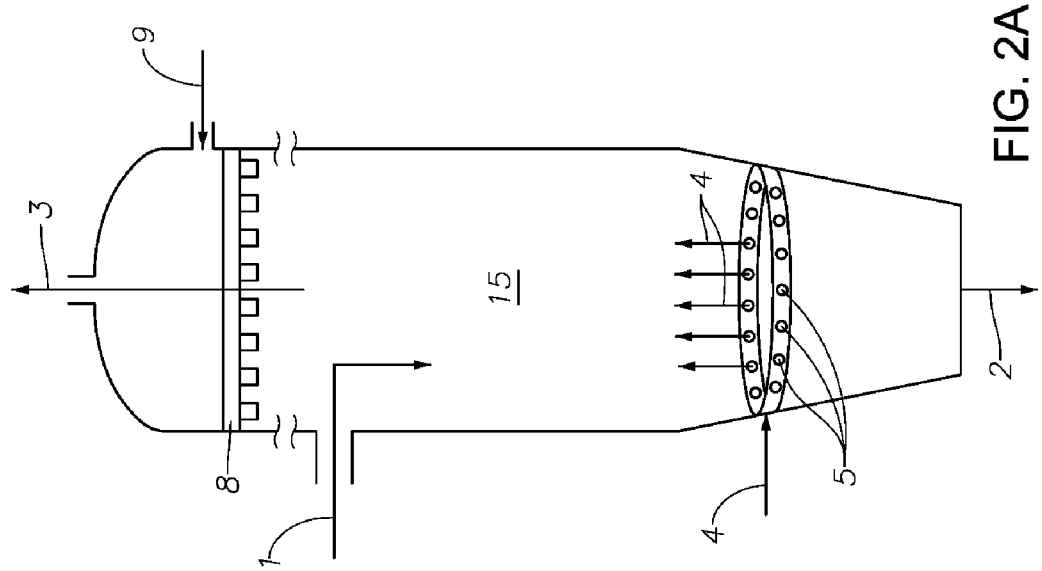

In some embodiments, the second purge gas may enter the gas-solid separation vessel through a second plurality of inlets, which may be advantageously located below the first plurality of inlets in the gas-solid separation vessel. In some embodiments, the second plurality of inlets may be optionally present along a perimeter of the gas-solid separation vessel. For example, with reference to FIG. 2B, a second purge gas stream 6 may enter a gas-solid separation vessel 20 through a second plurality of inlets 7.

In some embodiments, the first purge gas and/or the second purge gas may flow through the gas-solid separator at rates and/or in a direction sufficient to minimize the amount of gaseous unreacted hydrocarbon monomer and/or solvent present in the second stream as well as to minimize the amount of inert gas, such as nitrogen, present in the third stream. In some embodiments, the third stream may comprise an inert gas, such as nitrogen, based on total weight of the third stream, in an amount ≤about 10 wt %, ≤about 5.0 wt %, ≤about 1.0 wt %, ≤about 0.10 wt %, ≤about 0.010 wt %, ≤about 0.0010 wt % or about 0.0 wt %. Additionally or alternatively, the third stream may comprise an inert gas, such as nitrogen, based on total weight of the third stream, in an amount of about 0.0 wt % to about 10 wt %, about 0.0 wt % to about 5.0 wt %, about 0.0 wt % to about 1.0 wt %, about 0.0 wt % to about 0.10 wt %, about 0.0 wt % to about 0.010 wt %, or about 0.0 wt % to about 0.0010 wt %.

In some embodiments, the first purge gas and/or the second purge gas may flow in a direction substantially counter-current to a flow of the first stream through the gas-solid separation vessel. Alternatively, the second purge gas may flow in a direction substantially co-current to a flow of the first stream through the gas-solid separation vessel.

It is also contemplated herein that more than two purge gases may be introduced via more than two pluralities of inlets to the gas-solid separation vessel as needed. For example, a third purge gas may be introduced via a third plurality of inlets, a fourth purge gas may be introduced via a fourth plurality of inlets, a fifth purge gas may be introduced via a fifth plurality of inlets and so on. These additional purge gases may be heated by any suitable means (e.g., heat exchanger) to achieve a suitable temperature for further promoting removal of gaseous unreacted hydrocarbon monomer and/or solvent from the first stream. Preferably, these additional purge gases may have a temperature below the melting point temperature of the polyolefin solids. For example, these additional purge gases may have a similar temperature as discussed above for the first purge gas, e.g., ≥about 70° C., ≥about 75° C., ≥about 80° C., or ≥about 85° C., when entering the gas-solid separation vessel. Further, the additional purge gases may comprise one or more of a hydrocarbon monomer (e.g., propylene, ethylene, etc.) as described herein, a solvent as described herein and an inert gas as described herein.

Figure 3:
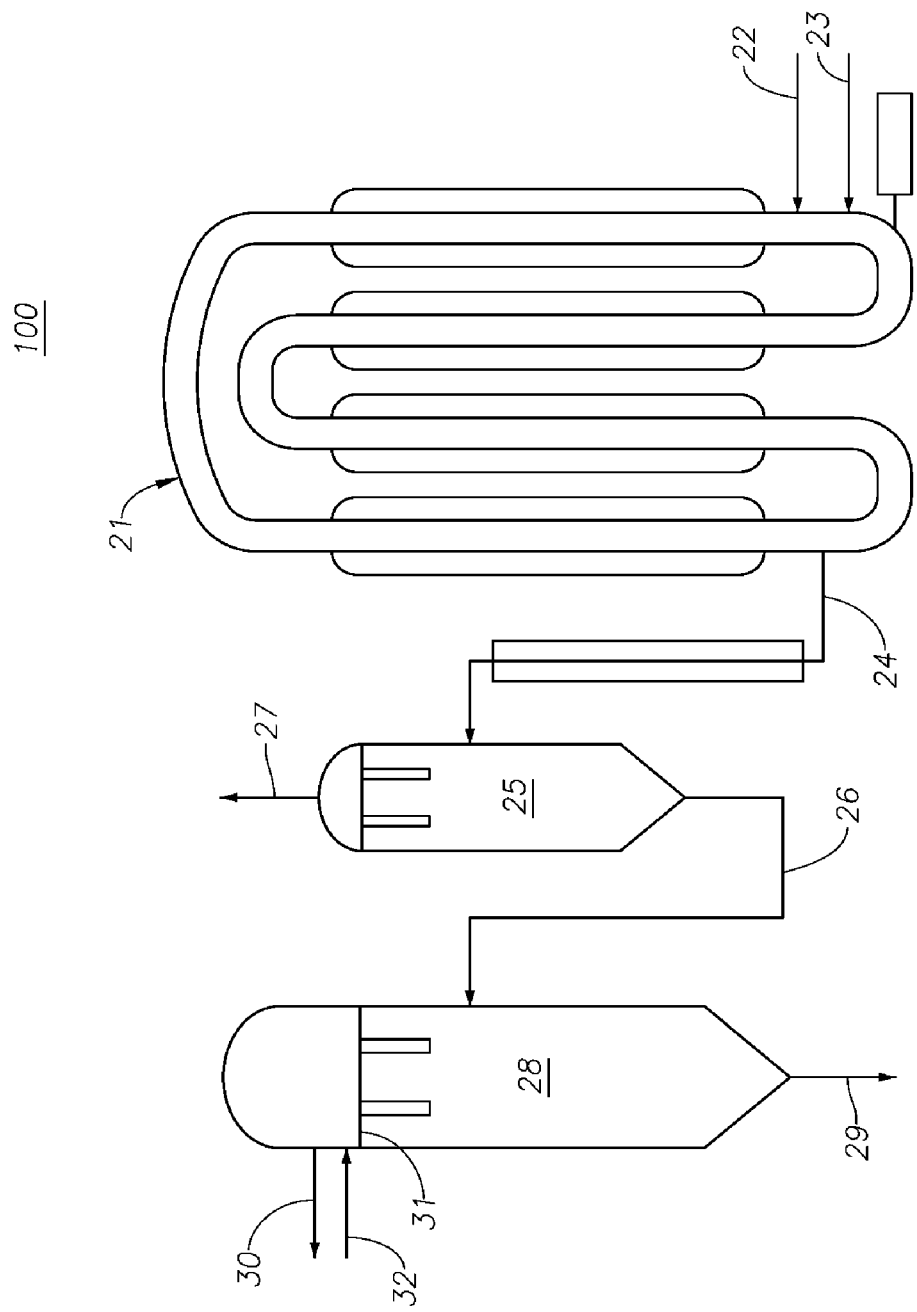
FIG. 3 illustrates a diagram of a polymerization system according to certain aspects of the present disclosure.

III. Polymerization Systems Including Systems for Separating Gaseous Components from Polyolefin Solids Polymerization systems including systems for separating gaseous components e.g., vaporized liquid medium comprising gaseous unreacted hydrocarbon monomer and/or solvent, from polyolefin solids are provided herein. For example, referring to FIG. 3, a system 100, which may separate gaseous unreacted hydrocarbon monomer and/or solvent from polyolefin solids is provided herein. System 100 may comprise at least one reactor 21 for polymerizing a hydrocarbon monomer, optionally with a liquid solvent, in the presence of a catalyst system to produce an effluent stream 24. In some embodiments, the at least one reactor 21 may be suitable for performing a slurry polymerization, for example, the at least one reactor 21 may be a loop reactor. It is contemplated herein that other suitable reactors may be used as determined by process requirements. A feedstream 22 comprising hydrocarbon monomer as described herein and optionally, a liquid solvent as described herein may be in fluid connection with the at least one reactor 21. A catalyst stream 23 comprising a catalyst as described herein may also be in fluid connection with the at least one reactor 21. In some embodiments, the at least one reactor 21 may be operated under conditions sufficient to produce the effluent stream 24 which may comprise a slurry of polyolefin solids as described herein, e.g., polyethylene and/or polypropylene, in a liquid medium, e.g., the liquid medium may comprise unreacted hydrocarbon monomer as described herein. In some embodiments, the hydrocarbon monomer and the unreacted hydrocarbon monomer each independently may comprise $C_2$ to $C_6$ olefins, in particular, propylene and/or ethylene. In some embodiments the liquid solvent may comprise unreacted hydrocarbons as described herein.

Additionally or alternatively, the system 100 may further comprise one or more liquid-solid separators 25, e.g., flash vessels as described herein, in fluid connection with the at least one reactor 21 including the effluent stream 24 in fluid connection with the liquid-solid separator 25. The one or more liquid-solid separators 25 may be operated under conditions as described herein to separate at least a portion of the liquid medium from the polyolefin solids to produce a gas-solids stream 26 and a first vapor stream 27. In some embodiments, the first vapor stream 27, in fluid connection with the liquid-solid separator 25, comprises at least a first portion of vaporized liquid medium, e.g., a majority of the vaporized liquid medium (≥about 50 wt %, ≥about 60 wt %, ≥about 70 wt %, ≥about 80 wt %, ≥about 90 wt %, ≥about 95 wt % of total vaporized liquid medium). The vaporized liquid medium may comprise gaseous unreacted hydrocarbon monomer and/or solvent. In some embodiments, the gas-solids stream 26, in fluid connection the liquid-solid separator 25, comprises polyolefin solids and at least a second portion of the vaporized liquid medium, for example, absorbed on and/or in the polyolefin solids and/or present interstitially amongst the polyolefin solids. In some embodiments, the second portion of a vaporized liquid medium may be at most the remainder (≤about 50 wt %, ≤about 40 wt %, ≤about 30 wt %, ≤about 20 wt %, ≤about 10 wt %, ≤about 5.0 wt % of total vaporized liquid medium) of vaporized liquid medium not present in the first vapor stream 27. Optionally, the system 100 may further comprise another reactor (not shown), such as a gas phase reactor as described herein, in fluid connection with the liquid-solid separator 25 and the gas-solid stream 26 for producing a further polyolefin solids stream (not shown).

In various aspects, the system 100 may further comprise a gas-solid separator 28 (e.g., a dust collector, a baghouse) in fluid connection with the liquid-solid separator 25 or optionally in fluid connection with a gas phase reactor (not shown) and the further polyolefin solids stream (not shown). The gas-solid separator 28 may have a volume sufficient so that polyolefin solids present in the gas-solids stream 26 or optionally the polyolefin solids present in the further polyolefin solids stream (not shown), in fluid connection with the gas-solid separator 28, have an increased residence time as described herein (e.g., ≥about 5.0 minutes, ≥about 10 minutes, etc.) within the gas-solid separator to separate the second portion of the vaporized liquid medium from the polyolefin solids in the gas-solids stream 26 to produce a solids stream 29 comprising polyolefin solids substantially free of the second portion of the vaporized liquid medium (e.g., gaseous unreacted hydrocarbon monomer and/or solvent) and a second vapor stream 30 comprising substantially the second portion of the vaporized liquid medium, wherein both the solids stream 29 and the second vapor stream 30 are in fluid connection with the gas-solid separator 28.

In some embodiments, the gas-solid separator 28 may further comprises a medium 31 as described herein for capturing solids present in the second vapor stream 30 prior to the second vapor stream 30 exiting the gas-solid separator 28. In some embodiments, the medium 31 may present above a gas-solids stream inlet.

In some embodiments, the system 100 may further comprise a blowback stream 32 as described herein in fluid connection with the gas-solid separator 28 for removing solids present in the medium 31. In some embodiments, a gas-solids stream 26 inlet (not shown), a blowback stream 32 inlet (not shown), and a second vapor stream 31 outlet (not shown) may be present in an upper portion of the gas-solid separator 28. In some embodiments, a gas-solids stream 26 inlet (not shown) may be below the blowback stream 32 inlet (not shown) and/or a second vapor stream 30 outlet (not shown). A solids stream 29 outlet (not shown) may be present in a lower portion of the gas-solid separator 28.

As discussed above, the solids stream 29 may comprise unreacted hydrocarbon monomer and/or solvent, based on total weight of the solids stream 29, in an amount ≤about 10 wt %, ≤about 5.0 wt %, ≤about 1.0 wt %, ≤about 0.10 wt %, ≤about 0.010 wt %, ≤about 0.0010 wt % or about 0.0 wt %. For example, the solids stream 29 may comprise unreacted hydrocarbon monomer and/or solvent, based on total weight of the solids stream 29, in an amount of about 0.0 wt % to about 10 wt %, about 0.0 wt % to about 5.0 wt %, about 0.0 wt % to about 1.0 wt %, about 0.0 wt % to about 0.10 wt %, about 0.0 wt % to about 0.010 wt %, or about 0.0 wt % to about 0.0010 wt %. Additionally or alternatively the second vapor stream 30 may comprise polyolefin solids, based on total weight of the second vapor stream 30, in an amount ≤about 5.0 wt %, ≤about 1.0 wt %, ≤about 0.10 wt %, ≤about 0.010 wt %, ≤about 0.0010 wt % or about 0.0 wt %. For example, the second vapor stream 30 may comprise polyolefin solids, based on total weight of the second vapor stream 30, in an amount of about 0.0 wt % to about 10 wt %, about 0.0 wt % to about 5.0 wt %, about 0.0 wt % to about 1.0 wt %, about 0.0 wt % to about 0.10 wt %, about 0.0 wt % to about 0.010 wt %, or about 0.0 wt % to about 0.0010 wt %.

In various embodiments, the gas-solid separator 28 may optionally comprise a first plurality of inlets for providing a first purge gas described herein. Additionally, the gas-solid separator 28 may optionally comprise a second a plurality of inlets for providing a second purge gas described herein. The first purge and/or second purge gas may be in fluid connection with the gas-solid separator 28.

In some embodiments, the system 100 may further comprise a dryer system (such as a batch or continuous mechanical dryer, not shown) for further separation of gaseous unreacted hydrocarbon monomer and/or the solvent from the polyolefin solids. Alternatively, a dryer system (not shown) for further separation of gaseous unreacted hydrocarbon monomer and/or the solvent from the polyolefin solids may not be present in the system 100.

As used herein, "consisting essentially of" means the process does not include process features not named in the claims but may include minor changes in pressure and/or temperature and/or flow of polymer and/or monomer effected by any desirable means but that does not alter the claimed steps and features. Likewise, for an apparatus the phrase "consisting essentially of" means the apparatus does not include any other major components that materially alter the overall apparatus, such as additional solvent removal steps, etc.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A method consisting essentially of:
   providing a slurry comprising polyolefin solids in a liquid medium, the liquid medium comprising unreacted hydrocarbon monomer and/or solvent;
   performing a liquid-solid separation to obtain a first stream comprising the polyolefin solids and a first portion of the liquid medium and a vaporized stream comprising a second portion of the liquid medium;
   flowing the first stream through a portion of a gas-solid separation vessel having a volume sufficient so that the polyolefin solids have a residence time within the gas-solid separation vessel greater than or equal to about 5.0 minutes; and
   separating the unreacted hydrocarbon monomer and/or solvent from the polyolefin solids to produce a second stream comprising polyolefin solids substantially free of the unreacted hydrocarbon monomer and/or solvent and a third stream comprising the unreacted hydrocarbon monomer and/or solvent from the first portion of the liquid medium;
   wherein the polyolefin solids substantially free of the unreacted hydrocarbon monomer and/or solvent are isolated only from the gas-solid separation vessel.

2. The method of claim 1, wherein flowing the first stream through the portion of the gas-solid separation vessel is performed at a temperature below a melting point temperature of the polyolefin solids and at a pressure of about 5 psig to about 15 psig.

3. The method of claim 1, wherein the first stream enters at an upper portion of the gas-solid separation vessel, the second stream exits at a lower portion of the gas-solid separation vessel, and the third stream exits at the upper portion of the gas-solid separation vessel.

4. The method of claim 1, wherein the residence time of the polyolefin solids is greater than or equal to about 10 minutes.

5. The method of claim 1, wherein the second stream comprises less than or equal to about 1.0 wt % unreacted hydrocarbon monomer and/or solvent, based on total weight of the second stream.

6. The method of claim 1, wherein the third stream comprises less than or equal to about 0.10 wt % polyolefin solids, based on total weight of the third stream.

7. The method of claim 1, wherein the gas-solid separation vessel further comprises a medium for capturing polyolefin solids present in the third stream prior to the third stream exiting the gas-solid separation vessel,
   wherein the medium is present above an inlet for providing the first stream.

8. The method of claim 7, wherein the gas-solid separation vessel further comprises a blowback stream for removing solids present in the medium.

9. The method of claim 1, wherein the polyolefin solids are produced by polymerizing a hydrocarbon monomer, optionally in the liquid solvent, in the presence of a catalyst under conditions to obtain the slurry.

10. The method of claim 9, wherein at least a portion of the third stream is recycled for use during polymerization.

11. The method of claim 1, wherein the unreacted hydrocarbon monomer comprises $C_2$ to $C_6$ olefins.

12. The method of claim 1, wherein the solvent comprises an unreactive hydrocarbon.

13. The method of claim 1, wherein the polyolefin solids comprise polyethylene and/or polypropylene.

14. The method of claim 1, wherein monomer scrubbers and mechanical dryers are absent.

15. A system consisting essentially of:
   at least one reactor for polymerizing a hydrocarbon monomer, optionally in a liquid solvent, in the presence of a catalyst to produce an effluent stream, wherein:
   a feedstream is in fluid connection with the at least one reactor, wherein the feedstream comprises the hydrocarbon monomer and optionally, the liquid solvent;
   a catalyst stream is in fluid connection with the at least one reactor; and the effluent stream is in fluid connection with the at least one reactor, wherein the effluent stream comprises a slurry of polyolefin solids in a liquid medium;

a liquid-solid separator in fluid connection with the at least one reactor for separating at least a portion of the liquid medium from the polyolefin solids to produce a gas-solids stream comprising the polyolefin solids and a first portion of the liquid medium and a first vapor stream comprising a second portion of the liquid medium, wherein:

the effluent stream is in fluid connection with the liquid-solid separator;

the first vapor stream is in fluid connection the liquid-solid separator; and the gas-solids stream is in fluid connection the liquid-solid separator; and a gas-solid separator in fluid connection with the liquid-solid separator, wherein the gas-solid separator has a volume sufficient so that the polyolefin solids present in the gas-solids stream have a residence time within the gas-solid separator greater than or equal to about 5.0 minutes to separate the first portion of the liquid medium from the polyolefin solids and to produce a solids stream comprising polyolefin solids substantially free of the first portion of the liquid medium and a second vapor stream comprising the first portion of the liquid medium; and wherein:

the gas-solids stream is in fluid connection with the gas-solid separator;

the solids stream is in fluid connection with the gas-solid separator; and the second vapor stream is in fluid connection with the gas-solid separator;

wherein polyolefin solids substantially free of the first portion of the liquid medium are isolated only from the gas-solid separator.

16. The system of claim 15, wherein the gas-solid separator further comprises a medium for capturing solids present in the second vapor stream prior to the second vapor stream exiting the gas-solid separator, wherein the medium is present above a gas-solids stream inlet.

17. The system of claim 16, wherein the gas-solid separator further comprises a blowback stream for removing solids present in the medium.

18. The system of claim 17, wherein the gas-solids stream inlet and a blowback stream inlet are present in an upper portion of the gas-solid separator, wherein the gas-solids stream inlet is below the blowback stream inlet; a solids stream outlet is present in a lower portion of the gas-solid separator; and a second vapor stream outlet is present in the upper portion of the gas-solid separator.

19. The system of claim 15, wherein a dryer system for separating the first portion of the liquid medium from the polyolefin solids is not present in the system.

20. The system of claim 15, wherein the solids stream comprises less than or equal to about 1.0 wt % of the first portion of the liquid medium, based on total weight of the solids stream, and/or the second vapor stream comprises less than or equal to about 0.10 wt % polyolefin solids, based on total weight of the second vapor stream.

21. The system of claim 15, wherein the hydrocarbon monomer comprises $C_2$ to $C_6$ olefins and/or the solvent comprises an unreactive hydrocarbon and/or the polyolefin comprises polyethylene and/or polypropylene.

* * * * *